United States Patent
Choi

(10) Patent No.: US 8,310,526 B2
(45) Date of Patent: Nov. 13, 2012

(54) 3-DIMENSIONAL IMAGE DISPLAY APPARATUS AND CONTROL METHOD OF THE SAME

(75) Inventor: Kyoung-oh Choi, Seoul (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 697 days.

(21) Appl. No.: 12/464,991

(22) Filed: May 13, 2009

(65) Prior Publication Data

US 2010/0141741 A1 Jun. 10, 2010

(30) Foreign Application Priority Data

Dec. 5, 2008 (KR) .................. 10-2008-0123503

(51) Int. Cl.
*H04N 13/04* (2006.01)
(52) U.S. Cl. .......................................... 348/51
(58) Field of Classification Search ................ None
See application file for complete search history.

(56) References Cited

U.S. PATENT DOCUMENTS

| | | | |
|---|---|---|---|
| 2007/0165304 A1* | 7/2007 | Tomita | 359/464 |
| 2009/0279016 A1* | 11/2009 | Ho et al. | 349/58 |
| 2010/0045780 A1* | 2/2010 | Kwon et al. | 348/51 |
| 2010/0289883 A1* | 11/2010 | Goris et al. | 348/56 |

* cited by examiner

*Primary Examiner* — George C Neurauter
*Assistant Examiner* — Suraj Joshi
(74) *Attorney, Agent, or Firm* — Sughrue Mion, PLLC

(57) ABSTRACT

Provided are a 3-dimensional image display apparatus and a control method thereof, the apparatus including: a video signal receiving unit which receives a video signal containing plane image data or stereoscopic image data from an external signal source; a liquid crystal module which includes a liquid crystal display panel to selectively display the plane image data and the stereoscopic image data, and a backlight unit provided in a rear portion of the liquid crystal display panel; a power supply which supplies power to the liquid crystal module; and a controller which determines whether the received video signal contains the plane image data or the stereoscopic image data, and if the video signal receiving unit contains the stereoscopic image data, the controller controls the power supply such that the backlight unit operates in a power saving mode while the stereoscopic image data is scanned to the liquid crystal display panel.

17 Claims, 8 Drawing Sheets

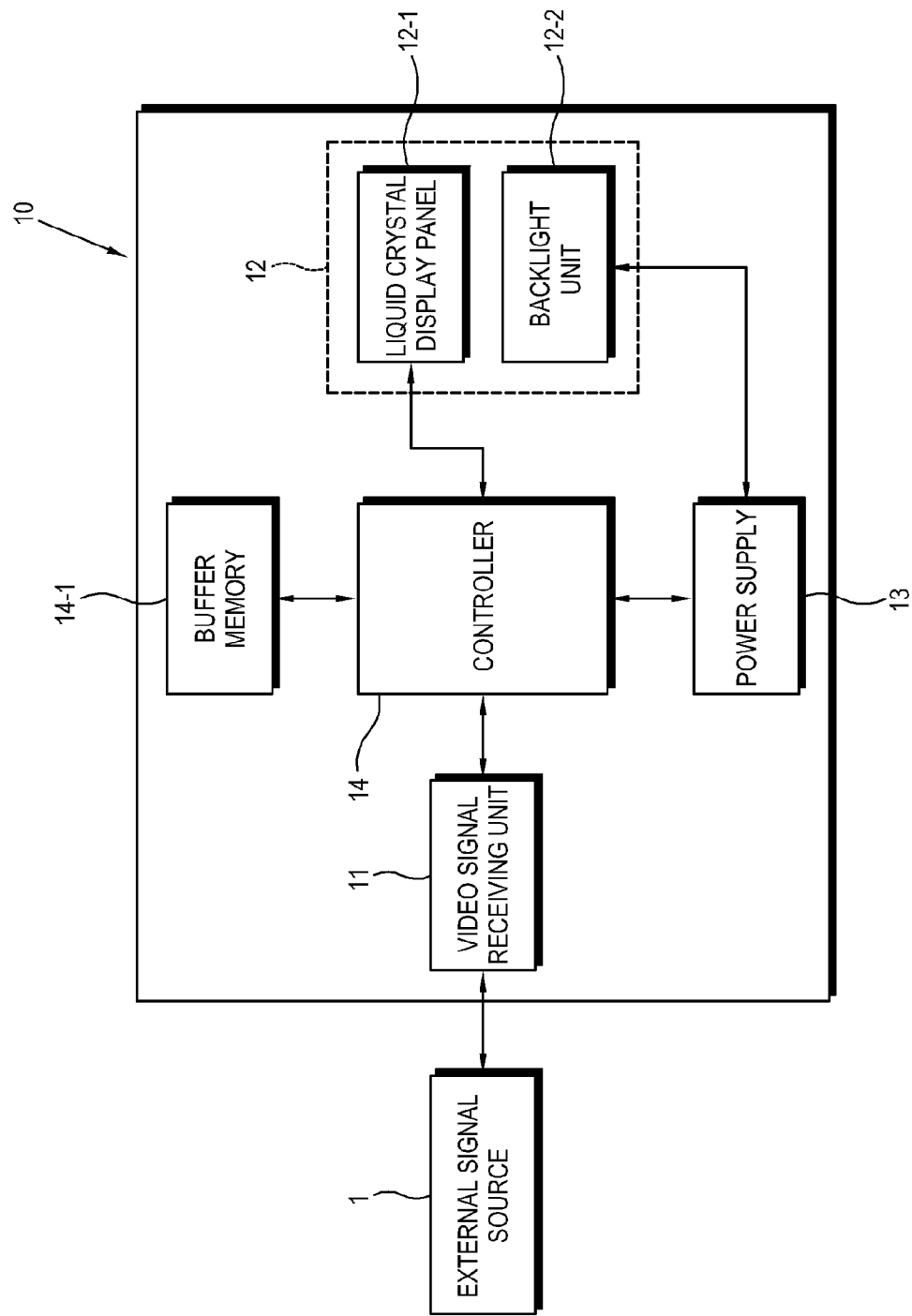

ial image display apparatus and a control method of the same, which can display an image according to dimensions of a video signal input from an external device such as a computer.

3-DIMENSIONAL IMAGE DISPLAY APPARATUS AND CONTROL METHOD OF THE SAME

CROSS-REFERENCE TO RELATED APPLICATION

This application claims priority from Korean Patent Application No. 10-2008-0123503, filed on Dec. 5, 2008 in the Korean Intellectual Property Office, the disclosure of which is incorporated herein by reference.

BACKGROUND OF INVENTION

1. Field of Invention

Apparatuses and methods consistent with the present invention relate to a 3-dimensional image display apparatus and a control method of the same, and more particularly to a 3-dimensional image display apparatus and a control method of the same, which can display an image according to dimensions of a video signal input from an external device such as a computer.

2. Description of the Related Art

With the development of technology, a display apparatus can now process and display various types of a video signal regardless of whether it is digital or analog. Further, watching a stereoscopic image based on a 3-dimensional video signal (hereinafter, referred to as a "stereoscopic video signal") through a monitor, a television or other display apparatus, has recently become possible.

In general, the stereoscopic video signal has contents divided corresponding to left and right eyes of a user as opposed to a two-dimensional video signal (hereinafter, referred to as a "plane" video signal). Also, the contents are displayed as divided images corresponding to the left and right eyes of a user, respectively.

At this time, to enable a user to experience the stereoscopic image based on the images being divided to the left and right eyes, a polarized-glass method and a shutter-glass method are employed. The polarized-glass method uses a phase-difference filter and the shutter-glass method displays left and right images alternately by switching a shutter on and off.

However, these related art methods do not provide an image of optimal quality and unnecessarily consume power in processing a stereoscopic video signal.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a 3-dimensional image display apparatus including: a video signal receiving unit which receives a video signal containing one of plane image data and stereoscopic image data from an external signal source; a liquid crystal module which includes a liquid crystal display panel to selectively display the plane image data and the stereoscopic image data, and a backlight unit provided in a rear portion of the liquid crystal display panel; a power supply which supplies power to the liquid crystal module; and a controller which determines whether the video signal received through the video signal receiving unit contains the plane image data or the stereoscopic image data, and if the video signal receiving unit contains the stereoscopic image data, the controller controls the power supply such that the backlight unit operates in a power saving mode while the stereoscopic image data is scanned to the liquid crystal display panel.

The liquid crystal module may include: an accommodating container which is placed in the rear portion of the liquid crystal display panel and accommodates the backlight unit; and an inverter which is placed in a rear portion of the accommodating container and converts the power received through the power supply into driving power to be supplied to the backlight unit, wherein the controller controls the power supplied from the power supply to the inverter while the stereoscopic image data is scanned to the liquid crystal display panel, so that the backlight unit operates in the power saving mode.

The controller may determine whether the video signal contains the stereoscopic image data on the basis of a vertical blanking interval (VBI) included in the video signal.

If the VBI included in the input video signal is greater than or equal to one of a VBI of a predetermined interval, the controller may determine that video signal includes the stereoscopic image data and controls the backlight unit to be in the power saving mode.

The predetermined interval may be one of a previous video signal and a preset interval.

The 3-dimensional image display apparatus may further include a user input unit which is selectable to operate in one of a stereoscopic image mode and a plane image mode, wherein, if the stereoscopic image mode is selected through the user input unit, the controller determines that the video signal received through the video signal receiving unit contains the stereoscopic image data.

The user input unit may include a hot key.

The 3-dimensional image display apparatus may further include: a memory which stores at least one on screen display (OSD) data; and an OSD generating unit which generates an OSD scene to provide an option for selecting the one of the stereoscopic image mode and the plane image mode.

The backlight unit may include at least one cold cathode fluorescent lamp, and the controller may control the power supply to turn off the at least one cold cathode fluorescent lamp in the power saving mode while the stereoscopic image data is scanned to the liquid crystal display panel.

The backlight unit may include a plurality of light emitting diodes (LED), and the controller may control the power supply to decrease power supplied to the plurality of LEDs in the power saving mode while the stereoscopic image data is scanned to the liquid crystal display panel.

Another aspect of the present invention is achieved by providing a control method of a 3-dimensional image display apparatus including a backlight unit and a liquid crystal display panel, the control method including: receiving from an external source a video signal containing one of plane image data and stereoscopic image data; determining whether the received video signal contains the plane image data or the stereoscopic image data; and controlling the backlight unit to operate in a power saving mode while the stereoscopic image data is scanned to the liquid crystal display panel if the received video signal contains the stereoscopic image data.

The determining whether the received video signal contains the plane image data or the stereoscopic image data may include comparing a vertical blanking interval (VBI) of the video signal and a predetermined value.

The determining whether the received video signal contains the plane image data or the stereoscopic image data may further include determining if the VBI is greater than or equal to the predetermined value.

The predetermined value may be one of a VBI of a previous video signal and a preset interval.

The controlling of the backlight unit may further include controlling the backlight unit to operate in a normal mode during the VBI of the video signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 1A is a block diagram of a 3-dimensional image display apparatus according to an exemplary embodiment of the present invention;

DETAILED DESCRIPTION OF EXEMPLARY EMBODIMENTS OF THE INVENTION

Figure 1B:
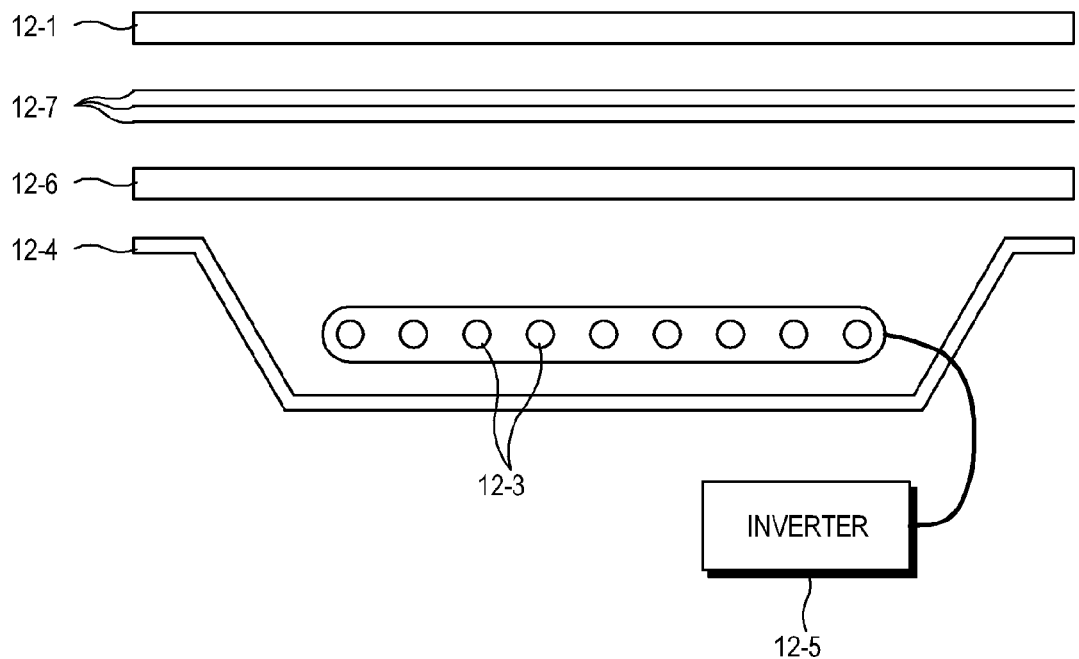
FIG. 1B is a sectional view of a liquid crystal module of the display apparatus of FIG. 1A.

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

Referring to the accompanying drawings, exemplary embodiments of the present invention are as follows.

FIG. 1 illustrates a 3-dimensional image display apparatus according to an exemplary embodiment of the present invention.

As shown in FIG. 1A, the 3-dimensional image display apparatus 10 according to an exemplary embodiment of the present invention includes a video signal receiving unit 11 to receive a video signal having plane image data or stereoscopic image data from an external signal source 1 such as a computer; and a liquid crystal module 12 including a liquid crystal display panel 12-1 to selectively display the plane image data and the stereoscopic image data, and a backlight unit 12-2 provided in the rear of the liquid crystal display panel 12-1.

Further, the 3-dimensional image display apparatus 10 includes a power supply 13 which supplies power to the liquid crystal module 12, and a controller 14 which controls the power supply 13 such that the backlight unit 12-2 operates in a power saving mode while scanning the stereoscopic image data to the liquid crystal display panel 12-1 if it is determined that the video signal received through the video signal receiving unit 11 contains the stereoscopic image data.

Here, the external signal source 1 may be achieved by not only the computer but also diverse multimedia reproducers which can convert various multimedia digital files into displayable signals.

The video signal receiving unit 11 may be achieved by an interface connectable to the external signal source 1. For example, the video signal receiving unit is achieved by a digital video interface (DVI) connector to receive a digital signal, a D-Sub connector to receive an analog signal, a universal serial bus (USB) port or the like various serial-type interface ports, or a wire/wireless network port.

Meanwhile, a buffer memory 14-1 is connected to the controller 14 and temporarily stores data therein so that the video signal received in the controller 14 can be converted to have a format to be displayable through the liquid crystal display panel 12-1.

As shown in FIG. 1B, the liquid crystal module 12 may include an accommodating container 12-4 placed in the rear of the liquid crystal display panel 12-1 and accommodating a plurality of cold cathode lamps 12-3 as the backlight unit 12-2, and an inverter 12-5 placed in the rear of the accommodating container 12-4 and converting the power received through the power supply 13 into driving power to be supplied to the backlight unit 12-2. Further, the liquid crystal module 12 includes a light guide plate 12-6 and a plurality of various optical sheets 12-7, which are placed between the backlight unit 12-2 and the light crystal display panel 12-1. Light emitted from the backlight unit 12-2 is uniformly irradiated to the liquid crystal display panel 12-1.

In FIG. 1B, the backlight unit 12-2 is provided as a direct type in which a light source emits light in the rear of the light guide plate, but not limited thereto. Alternatively, the backlight unit 12-2 may be provided as an edge type in which a light source is placed at lateral sides of the light guide plate.

Further, the backlight unit 12-2 may include at least one cold cathode fluorescent lamps (CCFL), at least one external electrode fluorescent lamp (EEFL), a plurality of light emitting diodes (LED), or the like various light sources.

The power supply 13 generally receives alternating current (AC) power from the outside, and supplies the AC power to various devices such as the backlight unit 12-2 of the liquid crystal module as it is converted into direct current (DC) or AC voltage, thereby driving the display apparatus.

Below, a control method of a 3-dimensional image display apparatus according to an exemplary embodiment of the present invention will be described with reference to FIGS. 2 and 3.

According to this exemplary embodiment of the present invention, the 3-dimensional image display apparatus 10 can selectively display the plane image data for the 2-dimensional image or the stereoscopic image data for the 3-dimensional image output from the external signal source 1.

Further, the plane image data or the stereoscopic image data is displayed as one frame on the liquid crystal display panel by a vertical synchronous signal contained in the video signal. Here, one vertical synchronous interval, i.e., an interval corresponding to one frame, is divided into an activated interval during which data is scanned, and a vertical blanking interval (VBI) during which data scanning is completed.

That is, the VBI divides the frames from each other. In other words, the VBI is a time taken in returning an electron beam from an electron gun provided inside a cathode ray tube (CRT) to an initial position. Therefore, there is no need of the VBI if a display device is a liquid crystal display panel. Nevertheless, the video signal is provided with the VBI in consideration of keeping compatibility between the display devices. In the case of the CRT display device, no image data is displayed on a screen during the VBI. On the other hand, in the case of the liquid crystal display panel, each pixel is driven by the liquid crystal display panel to keep its color and intensity, and thus the scanned image is displayed during the VBI.

Figure 2:
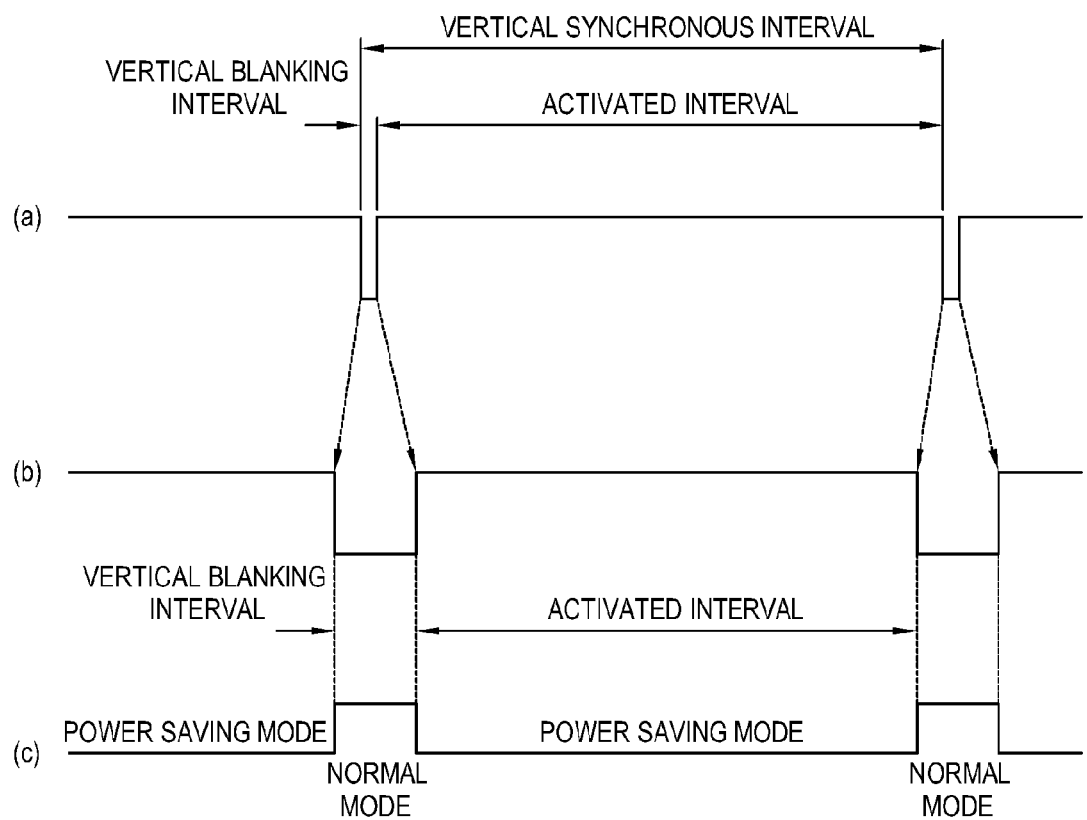
FIG. 2 is a timing diagram for explaining an operation of a 3-dimensional image display apparatus according to an exemplary embodiment of the present invention.

Meanwhile, (a) in FIG. 2 shows a vertical synchronous interval of the video signal containing the plane image data. At this time, the VBI occupies less than 25% of a total vertical synchronous interval, but this percentage may be varied depending on resolutions supportable by the liquid crystal display panel 12-1.

On the other hand, when the stereoscopic image data is displayed on the liquid crystal display panel 12-1, as shown in (b) of FIG. 2, the VBI is larger than that of the video signal containing the plane image data and occupies 25% or more of the vertical synchronous interval total. Likewise, this percentage may also be varied depending on the resolutions supportable by the liquid crystal display panel 12-1.

In the case that a user uses shutter-type glasses to watch a stereoscopic image through the 3-dimensional display apparatus according to an exemplary embodiment of the present invention, the VBI corresponds to a period of time when a left eye shutter or a right eye shutter is being opened.

To watch the stereoscopic image data displayed on the liquid crystal display panel 12-1, a user wears shutter-type stereoscopic glasses. In this case, the liquid crystal display panel 12-1 displays the image data for the left eye and the image data for the right eye alternately. Corresponding to the image data for the left eye and the image data for the right eye, a left shutter and a right shutter of the stereoscopic glasses are alternately opened to thereby allow a user to watch an image displayed on the liquid crystal display panel 12-1.

At this time, an interval during which the image data for the left eye is displayed as a full screen of the liquid crystal display panel 12-1 is the VBI after the image data for the left eye is completely scanned on the panel, and likewise an interval during which the image data for the right eye displayed as a full screen of the liquid crystal display panel 12-1 is also the VBI after the image data for the right eye is completely scanned on the panel.

Accordingly, in the case of the shutter-type stereoscopic glasses, a shutter for the right eye is opened during the VBI following an activated interval during which the image data for the right eye is scanned, and a shutter for the left eye is opened during the VBI following an activated interval during which the image data for the left eye is scanned. Thus, the open time for each shutter gets longer as the VBI becomes longer, so that a time during which the image is displayed increases, thereby enhancing recognition of the image based on the image data.

Further, the left shutter and the right shutter are kept closed during the activated interval in which the image data for the right or left eye is scanned, so that a user cannot watch the screen.

Meanwhile, (c) of FIG. 2 shows that the backlight unit 12-1 of the 3-dimensional image display apparatus operates in the power saving mode. As shown therein, the backlight unit 12-2 operates in the power saving mode during the activated interval in which the image data is scanned, but operates in a normal mode during the VBI.

Figure 3A:
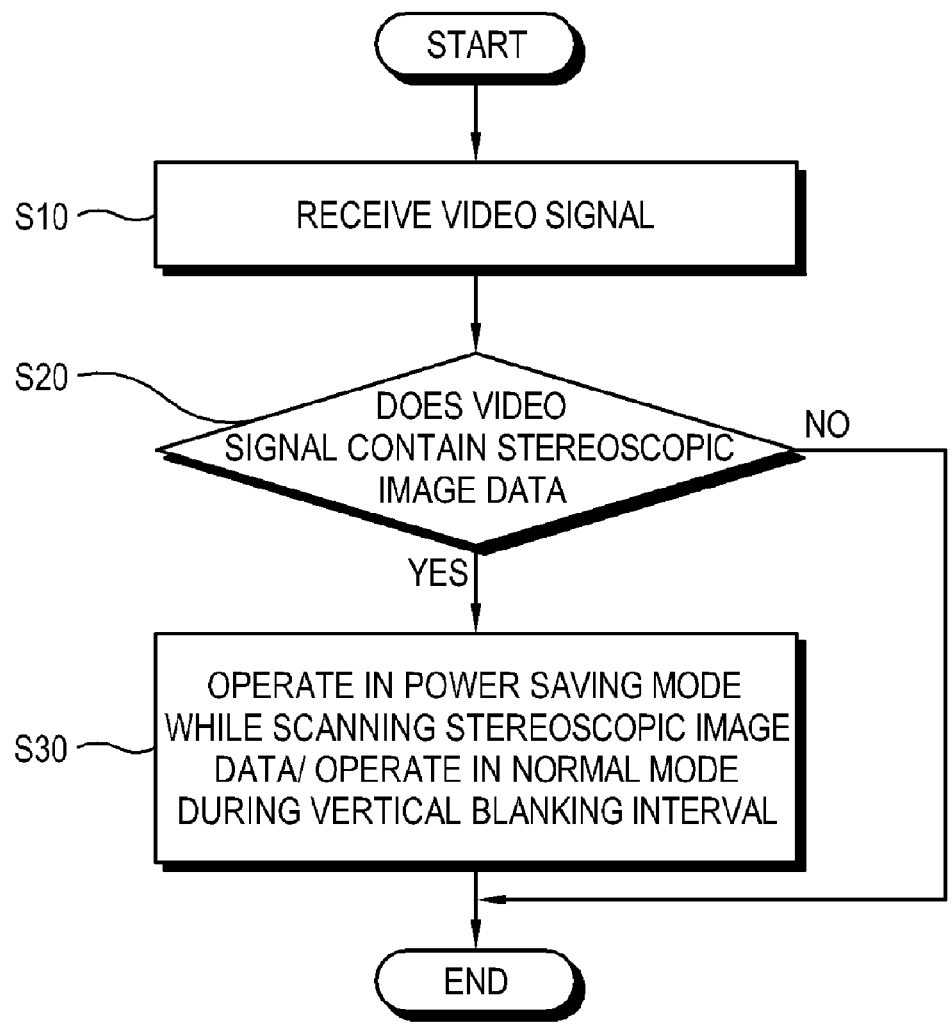
FIGS. 3A and 3B are flowcharts for explaining a control method of the 3-dimensional image display apparatus according to an exemplary embodiment of the present invention.

Referring to FIG. 3A, a control method of the 3-dimensional image display apparatus is as follows. First, at operation S10, a video signal containing stereoscopic image data is received. Next, at operation S20, the controller determines whether the received video signal contains stereoscopic image data. If the controller determines the received video signal contains stereoscopic image data (S20-Y) then, at operation S30, the controller 14 drives the backlight unit 12-2 in the power saving mode while the stereoscopic image data is scanned, i.e., during the activated interval, but drives the backlight unit 12-2 in the normal mode while the shutters for the left and right eyes are opened, i.e., during the VBI. On the other hand, if the controller determines the received video signal contains stereoscopic image data (S20-N), the process ends.

Figure 3B:
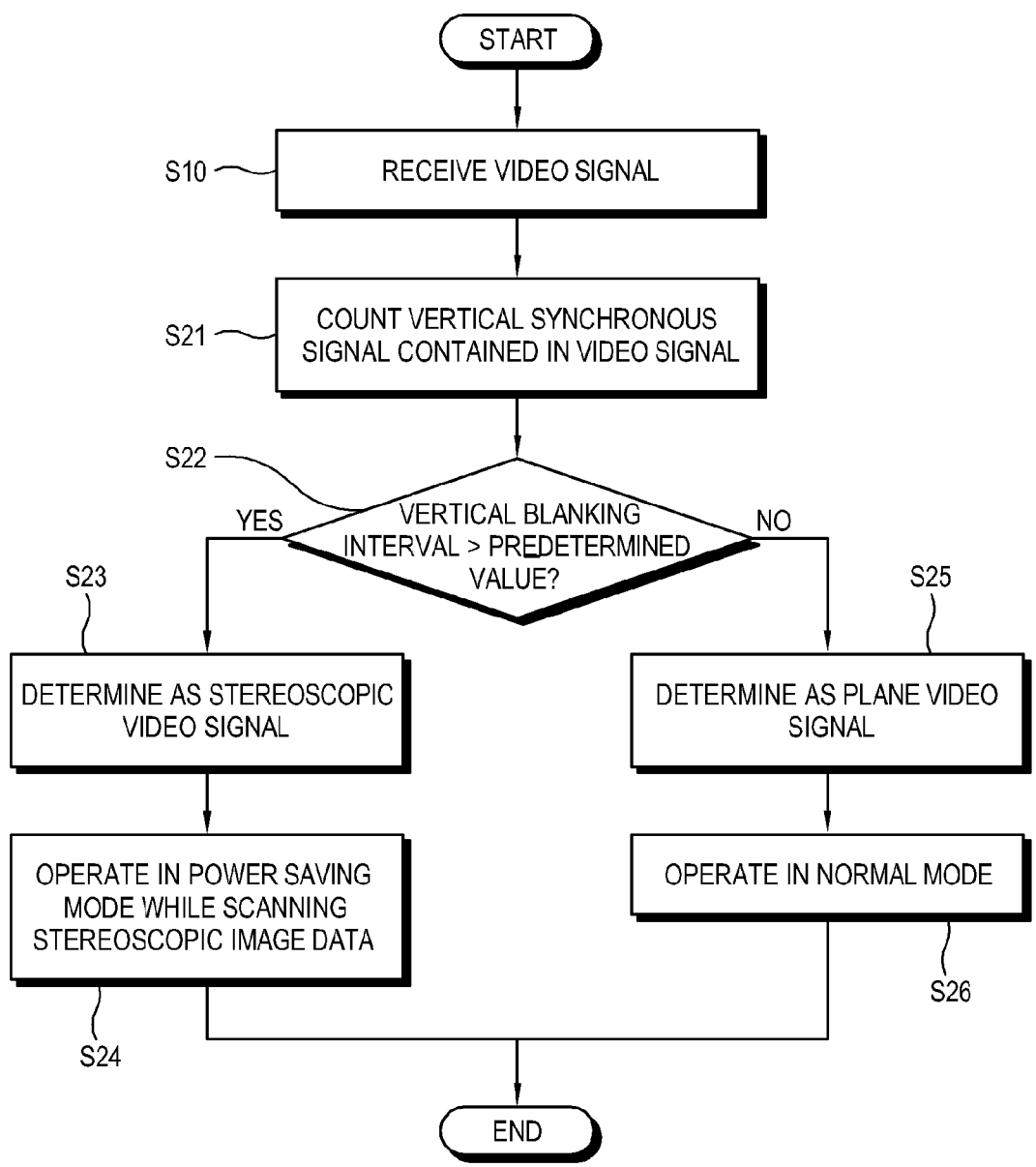

FIG. 3B is a flowchart for explaining detail control of power to be supplied to the backlight unit 12-2. If the video signal is received at the operation S10, the controller 14 counts horizontal and vertical synchronous signals contained in the video signal at operation S21.

At operation S22, the controller 14 determines resolution of a video signal, and determines whether or not its VBI included in the vertical synchronous interval is larger than a predetermined value. The predetermined value can be, for example, the VBI of a previous video signal or a preset interval. As a result, if the VBI of the input video signal is larger than or the same size as the VBI of the previous video signal or the preset interval, the controller 14 determines that the currently input video signal contains the stereoscopic image data at operation S23, and controls the power supplied to the backlight unit 12-2 of the liquid crystal module 12 to be in the power saving mode during the activated interval in which the stereoscopic image data is scanned at operation S24. Here, the power saving mode can be achieved by decreasing or intercepting (i.e., powering off) the power supplied to the cold cathode fluorescent lamp (CCFL) or the light emitting diode (LED) included in the backlight unit 12-2.

Some of the plural lamps or LEDs may be turned off, or all of them may be turned off. The controller 14 adjusts the power supplied from the power supply 13 to the inverter 12-5 in order to control the driving power supplied to the backlight unit 12-2. It will be appreciated that the normal mode for normally supplying the power to the backlight unit 12-2 is carried out during the VBI in which the data for the left or right eye is displayed as the full screen of the liquid crystal display panel 12-1.

Here, the preset interval, to be compared with the VBI of the input video signal so as to determine whether the input video signal includes plane image data or stereoscopic image data, may be optionally set in a user mode or a manufacturer mode according to resolution corresponding to the number of pixels of the liquid crystal display panel or driving timing of the liquid crystal display panel.

Also, the preset interval may be set as the VBI of the previous video signal displayed on the liquid crystal display panel, so that it is determined that the currently input vide signal contains the stereoscopic image data if the VBI of the currently input video signal is larger than that of the previous video signal, thereby controlling the backlight unit 12-2 to operate in the normal mode with normal power supply during only the VBI and in the power saving mode during the interval in which the image data is scanned.

On the other hand, if the VBI of the currently input video signal is smaller than the VBI of the previous video signal or the preset interval, it is determined at operation S25 that the currently input video signal contains the plane image data, and thus the backlight unit 12-2 operates in the normal mode at operation S26.

Figure 4:
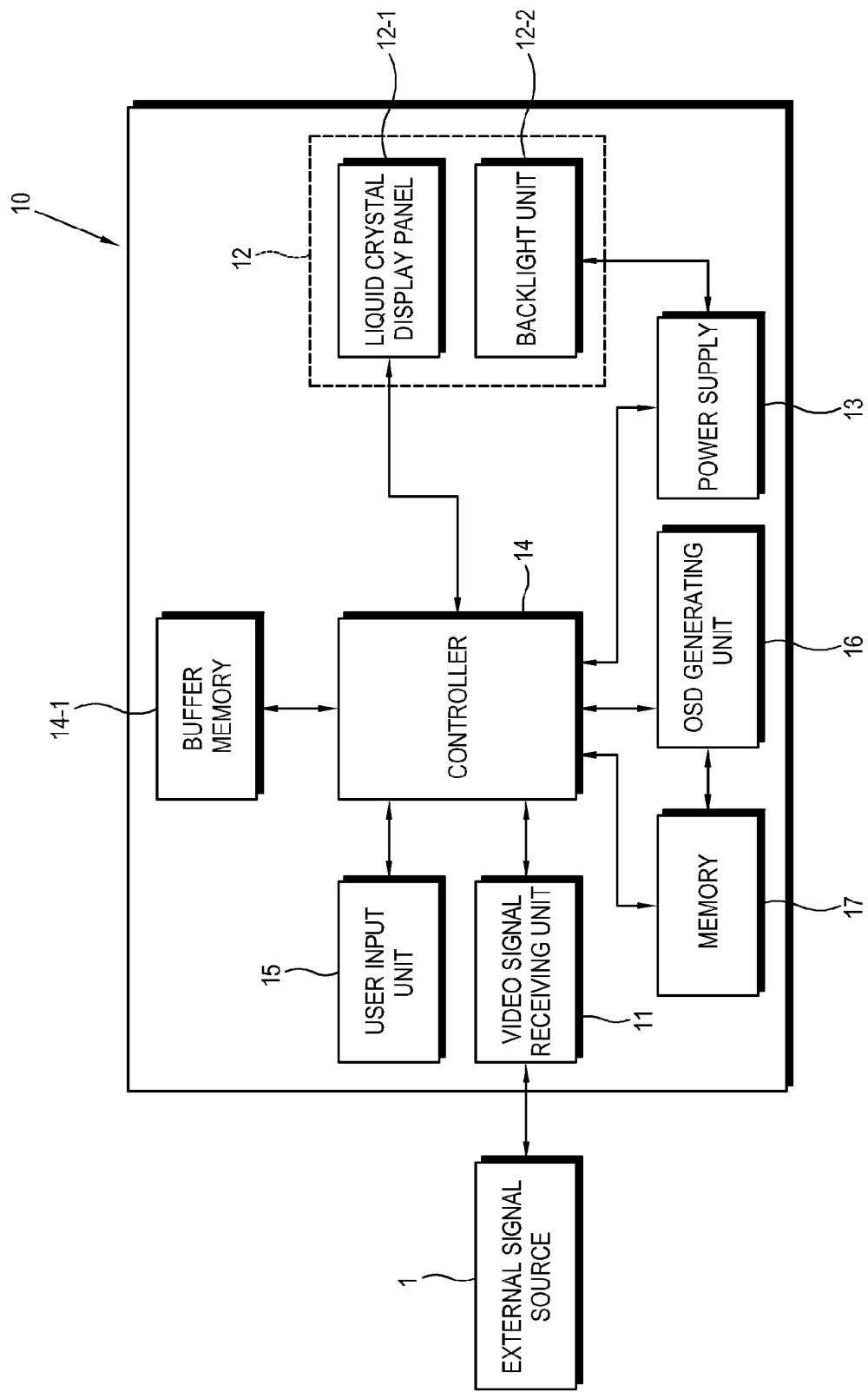
FIG. 4 is a block diagram showing a 3-dimensional image display apparatus according to another exemplary embodiment of the present invention.

FIG. 4 is a block diagram showing a 3-dimensional image display apparatus according to another exemplary embodiment of the present invention.

As shown therein, the 3-dimensional image display apparatus according to this exemplary embodiment includes a user input unit 15 for a user's selection, an on screen display (OSD) generating unit 16 which generates an OSD scene as a user interface, and a memory 17 which stores OSD data therein.

The user input unit 15 may be provided as a button such as a hot key included in the 3-dimensional image display apparatus, a remote controller or the like. Alternatively, the user input unit 15 may be provided as a typical input unit such as a touch panel, a mouse, etc. Thus, a user can optionally setup a stereoscopic image mode or a plane image mode through the user input unit 15.

The memory 17 stores various data about a font size, a color, an image, etc. included in the OSD scene I.

Figure 5:
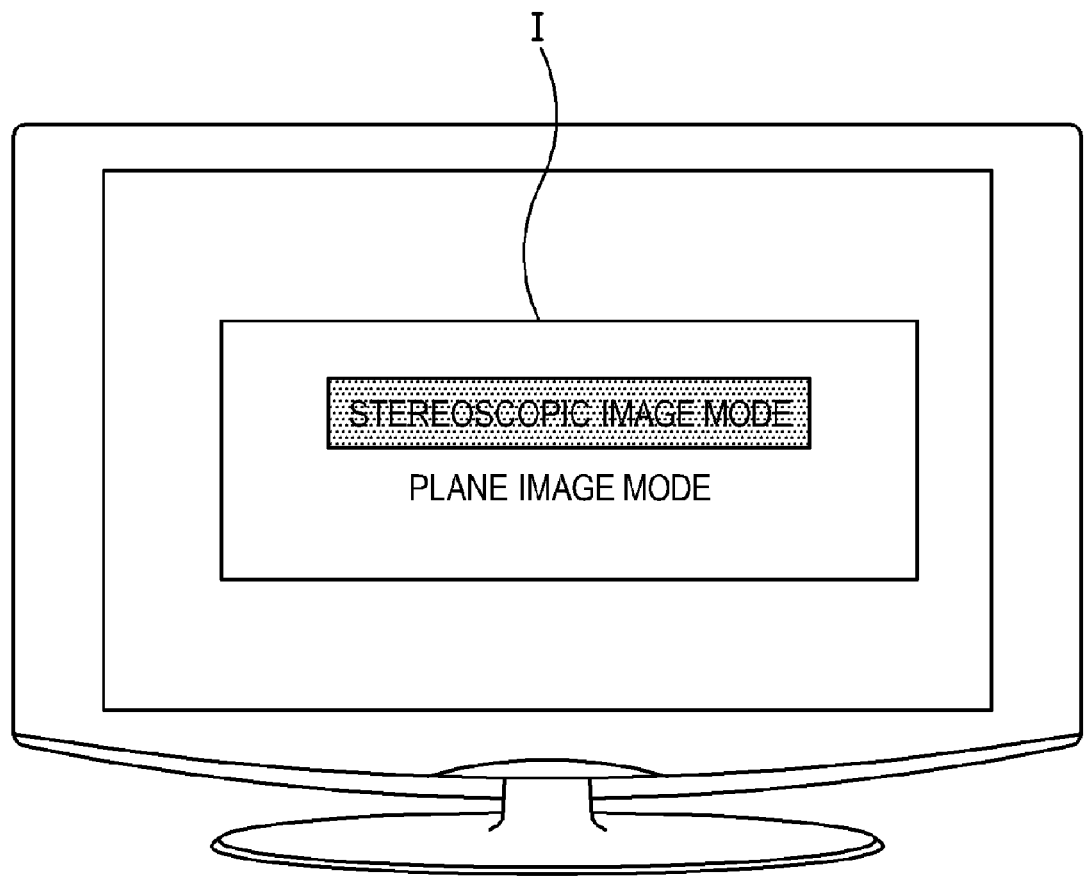
FIG. 5 is a view showing an exemplary embodiment of an on screen display (OSD) scene of the 3-dimensional image display apparatus of FIG. 4.

The OSD generating unit 16 generates the OSD scene I under control of the controller 14 to thereby allow a user to select either of the stereoscopic image mode or the plane image mode, and displays the OSD scene I on the liquid crystal display panel 12-1. FIG. 5 is a view showing an exemplary embodiment of the OSD scene I of the 3-dimensional image display apparatus. The OSD scene I includes items about the "stereoscopic image mode" or the "plane image mode," and overlaps with the video signal being displayed on the liquid crystal display panel 12-1. At this time, transparency of the OSD scene I may be controlled freely. Also, each item of the OSD scene I is highlighted when selected by a user.

Figure 6:
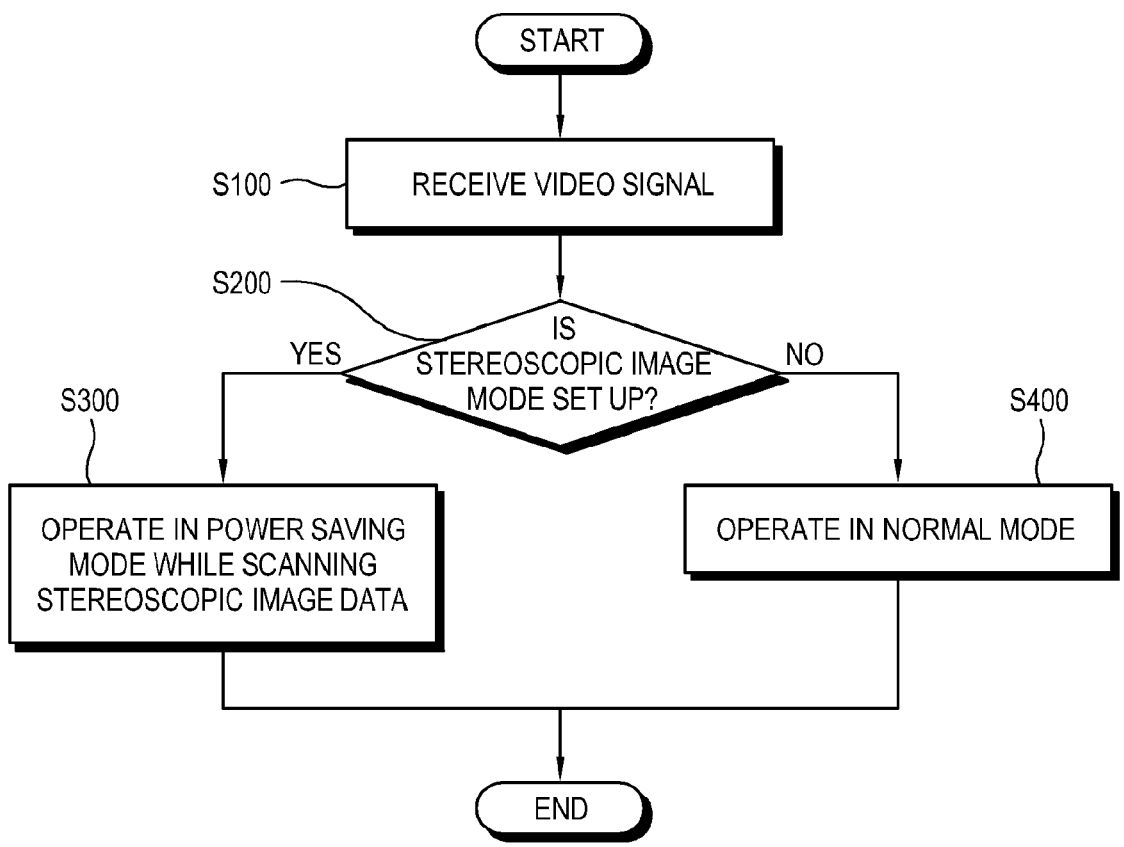
FIG. 6 is a flowchart of for explaining a control method of the 3-dimensional image display apparatus according of FIG. 4.

FIG. 6 is a flowchart of for explaining a control method of the 3-dimensional image display apparatus according of FIG. 4. Referring to FIG. 6, the control method of the controller 14 is as follows.

First, a video signal is received from the outside at operation S100, and then the controller 14 determines whether a display mode is setup as the stereoscopic image mode through the user input unit 15 at operation S200.

In result, if it is determined that the stereoscopic image mode is selected by a user, at operation S300 the backlight unit 12-2 operates in the power saving mode while the stereoscopic image data is scanned. That is, according to this exemplary embodiment, in the case that the stereoscopic image data is input, a user may select control for driving the backlight unit 12-2 to operate in the power saving mode during a certain interval. When the stereoscopic image mode is selected by a user, the controller 14 drives the backlight unit 12-2 to operate in the power saving mode while the stereoscopic image data is scanned.

On the other hand, in the case that a user selects not the stereoscopic image mode but the plane image mode, the controller 14 drives the backlight unit 12-2 to operate in the normal mode regardless of whether the video signal contains the stereoscopic image data or not, at operation S400.

In the display apparatus receiving stereoscopic image data according to an exemplary embodiment of the present invention, the power saving mode is achieved by a user's selection or automatically during a certain interval.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A 3-dimensional image display apparatus comprising:
    a video signal receiving unit operable to receive a video signal containing one of plane image data and stereoscopic image data from an external signal source;
    a liquid crystal module which includes a liquid crystal display panel to selectively display the plane image data and the stereoscopic image data, and a backlight unit provided in a rear portion of the liquid crystal display panel;
    a power supply which supplies power to the liquid crystal module; and
    a controller which determines whether the video signal received through the video signal receiving unit contains the plane image data or the stereoscopic image data, and if the video signal receiving unit contains the stereoscopic image data, the controller controls the power supply such that the backlight unit operates in a power saving mode while the stereoscopic image data is scanned to the liquid crystal display panel.

2. The 3-dimensional image display apparatus according to claim 1, wherein the liquid crystal module comprises:
    an accommodating container which is placed in the rear portion of the liquid crystal display panel and accommodates the backlight unit; and
    an inverter which is placed in a rear portion of the accommodating container and converts the power received through the power supply into driving power to be supplied to the backlight unit,
    wherein the controller controls the power supplied from the power supply to the inverter while the stereoscopic image data is scanned to the liquid crystal display panel, so that the backlight unit operates in the power saving mode.

3. The 3-dimensional image display apparatus according to claim 2, wherein the controller determines whether the video signal contains the stereoscopic image data on the basis of a vertical blanking interval (VBI) included in the video signal.

4. The 3-dimensional image display apparatus according to claim 3, wherein if the VBI included in the input video signal is greater than or equal to a predetermined value, the controller determines that video signal contains the stereoscopic image data and controls the backlight unit to be in the power saving mode.

5. The 3-dimensional image display apparatus according to claim 4, wherein the predetermined value is one of a VBI of a previous video signal and a preset interval 6. The 3-dimensional image display apparatus according to claim 2, further comprising a user input unit which is selectable to operate in one of a stereoscopic image mode and a plane image mode,
    wherein, if the stereoscopic image mode is selected through the user input unit, the controller determines that the video signal received through the video signal receiving unit contains the stereoscopic image data.

7. The 3-dimensional image display apparatus according to claim 6, wherein the user input unit comprises a hot key.

8. The 3-dimensional image display apparatus according to claim 6, further comprising:
    a memory which stores at least one on screen display (OSD) data; and
    an OSD generating unit which generates an OSD scene to provide an option for selecting the one of the stereoscopic image mode and the plane image mode.

9. The 3-dimensional image display apparatus according to claim 2, wherein the backlight unit comprises at least one cold cathode fluorescent lamp, and
    the controller controls the power supply to turn off the at least one cold cathode fluorescent lamp in the power saving mode while the stereoscopic image data is scanned to the liquid crystal display panel.

10. The 3-dimensional image display apparatus according to claim 2, wherein the backlight unit comprises a plurality of light emitting diodes (LED), and the controller controls the power supply to decrease power supplied to the plurality of LEDs in the power saving mode while the stereoscopic image data is scanned to the liquid crystal display panel.

11. A control method of a 3-dimensional image display apparatus including a backlight unit and a liquid crystal display panel, the control method comprising:

receiving from an external signal source a video signal containing one of plane image data and stereoscopic image data;

determining whether the received video signal contains the plane image data or the stereoscopic image data; and controlling the backlight unit to operate in a power saving mode while the stereoscopic image data is scanned to the liquid crystal display panel if the received video signal contains the stereoscopic image data.

12. The control method according to claim 11, wherein in the power saving mode, the power supplied to the backlight unit is controlled.

13. The control method according to claim 11, wherein in the power saving mode, the power supplied to the backlight unit is turned off.

14. The control method according to claim 11, wherein the determining whether the received video signal contains the plane image data or the stereoscopic image data includes comparing a vertical blanking interval (VBI) of the video signal and a predetermined value.

15. The control method according to claim 14, wherein the determining whether the received video signal contains the plane image data or the stereoscopic image data further includes determining if the VBI is greater than or equal to the predetermined value.

16. The control method according to claim 15, wherein the predetermined value is one of a VBI of a previous video signal and a preset interval.

17. The control method according to claim 11, wherein the controlling the backlight unit further includes controlling the backlight unit to operate in a normal mode during the VBI of the video signal.

* * * * *